United States Patent [19]

Podolak et al.

[11] Patent Number: 4,816,829
[45] Date of Patent: Mar. 28, 1989

[54] METHOD OF AND APPARATUS FOR CONVERTING DIGITAL DATA BETWEEN DATA FORMATS

[75] Inventors: J. B. Podolak, Schaumburg; Ronald B. Saluski, Bolingbrook, both of Ill.

[73] Assignee: R. R. Donnelley & Sons Company, Chicago, Ill.

[21] Appl. No.: 44,238

[22] Filed: Apr. 30, 1987

[51] Int. Cl.[4] .............................................. H03M 5/10
[52] U.S. Cl. .................................. 341/122; 341/123; 341/132; 341/54
[58] Field of Search ................ 340/347 DD, 347 SH; 364/724, 179, 178; 341/50, 51, 69, 86, 122, 123, 132

[56] References Cited

U.S. PATENT DOCUMENTS

| | | | |
|---|---|---|---|
| 3,299,204 | 1/1967 | Cherry et al. | 178/6 |
| 3,324,237 | 6/1967 | Cherry et al. | 178/6 |
| 3,449,742 | 6/1969 | Stapleton | 340/347 |
| 4,308,585 | 12/1981 | Jordan | 364/520 |
| 4,348,699 | 9/1982 | Tsuchiya et al. | 360/32 |
| 4,370,643 | 1/1983 | Kitamura | 340/347 |
| 4,568,912 | 2/1986 | Kitamura et al. | 340/347 |
| 4,673,916 | 6/1987 | Kitamura et al. | 340/347 |

OTHER PUBLICATIONS

IBM Technical Disclosure Bulletin, vol. 20, No. 4 (Sep. 1977) "Compression of Silence in Digitized Speech Recording", M. A. Patten.

*Primary Examiner*—Bernard Roskoski
*Assistant Examiner*—Gary J. Romano
*Attorney, Agent, or Firm*—Wood, Dalton, Phillips, Mason & Rowe

[57] ABSTRACT

A method of and apparatus for converting between first and second digital data formats is disclosed whereby digital words of the first format are analyzed to detect an upper bandwidth limit of a corresponding analog signal in an interval thereof defined by such words and to determine the level of the analog signal at the beginning of such interval. A digital word of the second format is encoded with first and second pluralities of bits representing the determined upper bandwidth limit and the level of the corresponding analog signal at the beginning of the interval.

14 Claims, 6 Drawing Sheets where i equals 1, 2, 3, . . . . As seen in FIGS. 3A-3D, these words $W_i$ define a plurality of voltage levels of a first or input stepwise approximation 40 of a corresponding analog signal 42. As noted previously, the levels of the approximation 40 are of equal length and result from sampling at a 44.1 kilohertz clock rate.

Figure 2A:
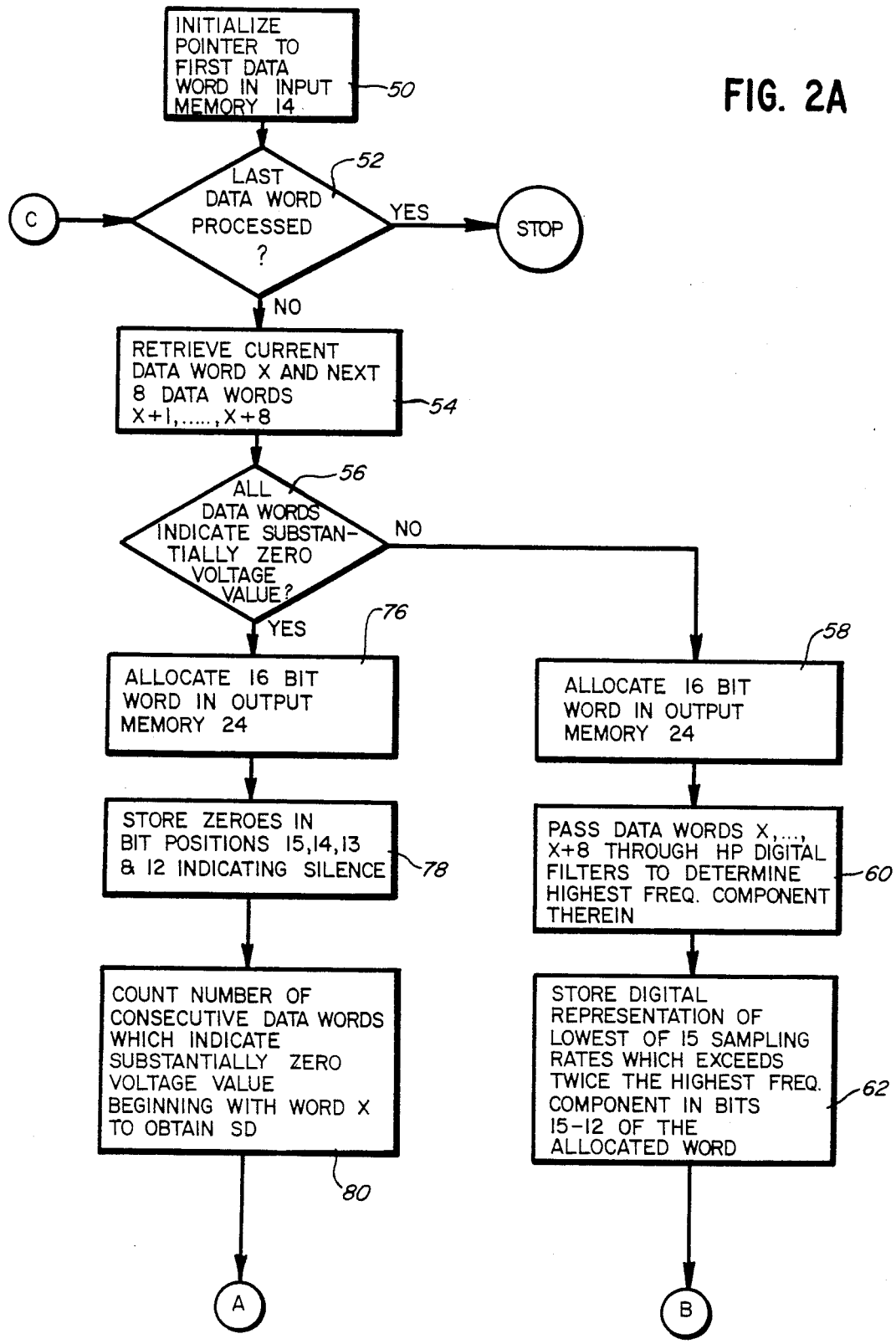
Figure 3A:
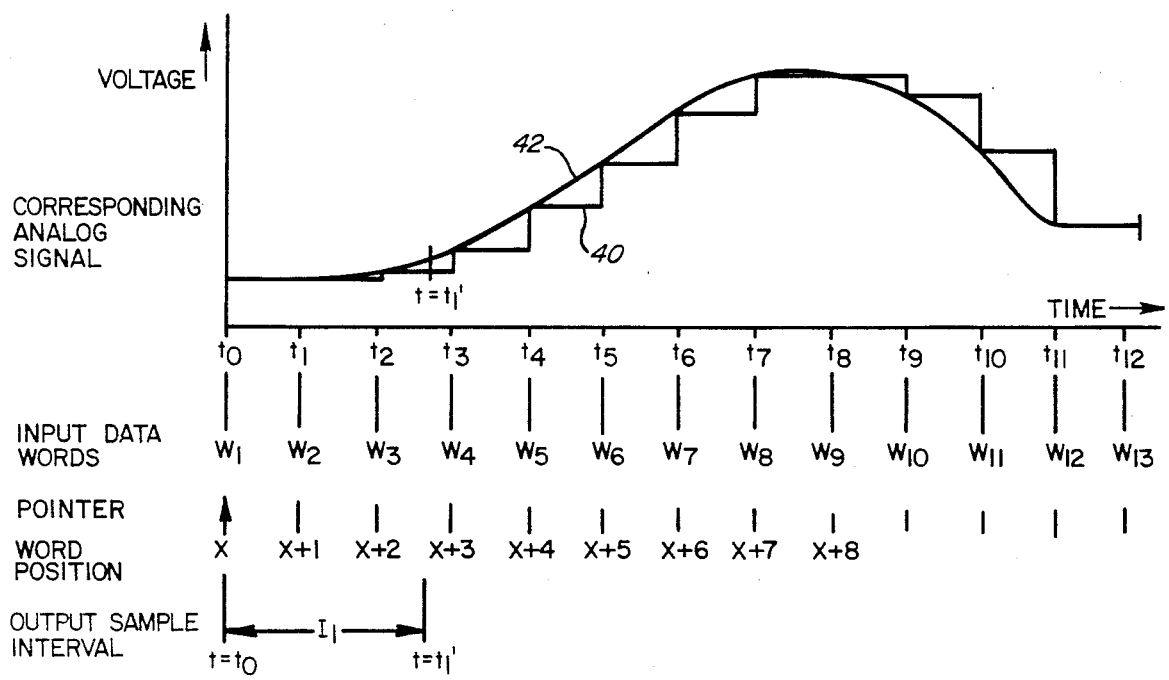

Referring specifically to FIGS. 2A and 3A, the program begins at a block 50 which initializes a pointer to the first data word $W_1$ in the input memory 14. As seen in FIG. 3A, the pointer defines a variable X which indicates the current position of the pointer. The variable X is also used to determine a "look-ahead" interval defined by the word at position X in the memory and the data words in the memory 14 which define the eight consecutive successive steps in the first stepwise approximation 40 following the step defined by the word at position X. This look-ahead interval is used to determine the lengths of the voltage levels defined by the digital words of the second data format, as noted more specifically below.

It should be noted that the look-ahead interval must be at least as long as the greatest durational value of the set of N durational values.

Following the block 50, a block 52 checks to determine whether the last data word in the input memory 14 has been processed. If so, then all of the data in the input memory 14 has been converted into digital data of the second format and hence the program is terminated.

On the other hand, if the last data word has not been processed, control passes to a block 54 which retrieves the current data word at position X and the next eight data words at positions X+1, X+2, . . . X+8 from the memory 14. In the example shown in FIG. 3A, the words $W_1$-$W_9$ are retrieved and are analyzed by a block 56 which checks to determine whether these words all indicate a substantially zero voltage value in the corresponding analog signal 42 for an interval extending from time $t=t_0$ to time $t=t_9$. For the example shown in FIG. 3A, the corresponding analog signal 42 is not at a substantially zero value throughout this period of time, and hence control passes to a block 58 which allocates a 16 bit space in the output memory 24 in which will be stored a digital word $W_{OUT1}$ of the second format.

Figure 1:
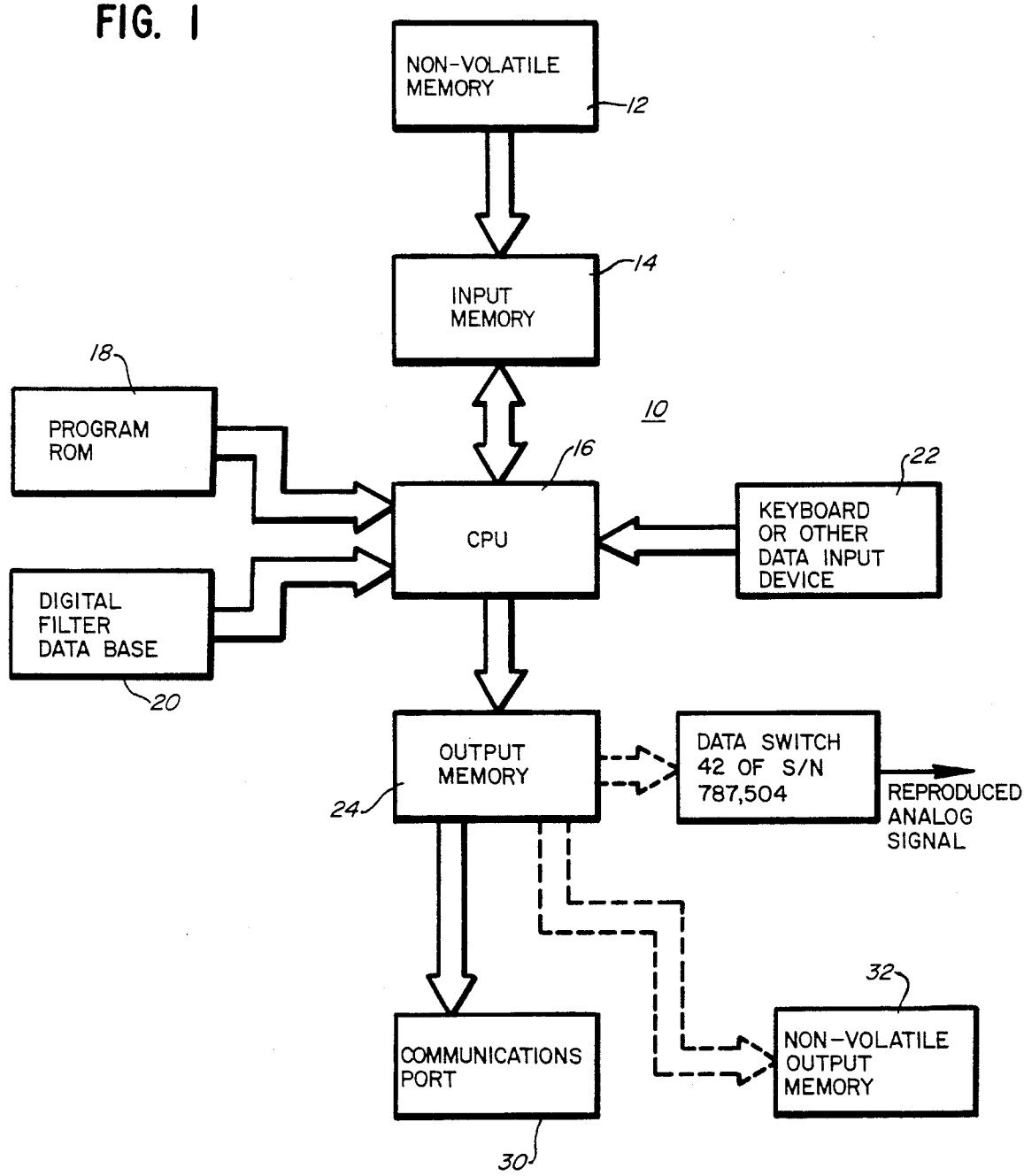

A block 60 then accesses the digital filter data base 20, FIG. 1, and passes the digital data words at positions X, X+1, . . . X+8 through a plurality of high-pass digital filters so as to determine the range in which the highest frequency component of the corresponding analog signal 42 lies for the period of time $t=t_0$ through $t=t_9$. In the preferred embodiment, the digital words are passed through 14 high-pass digital filters having cut-off frequencies $f_{c1}$-$f_{c14}$ which are spaced throughout the anticipated frequency spectrum of the analog signal 42. When the analog signal to be reproduced comprises an audio signal, the cutoff frequencies $f_{c1}$-$f_{c14}$ may be established at 1 kilohertz, 2 kilohertz, 3 kilohertz, 4 kilohertz, 5 kilohertz, 6.6 kilohertz, 8 kilohertz, 9 kilohertz, 10 kilohertz, 11.5 kilohertz, 13 kilohertz, 14.5 kilohertz, 16 kilohertz and 18 kilohertz. During this process, the CPU determines which of the fourteen high-pass filters generate an output and develops a signal $f_n$ representing the range of the upper bandwidth limit. This range signal identifies the cut-off frequency of the highest-frequency high-pass filter which developed an output. For example, when the highest frequency in the look-ahead interval is 8.5 kilohertz, the signal $f_n$ identifies the 8 kilohertz high-pass filter as being the highest-frequency filter which generate an output when the 9 words at positions X, X+1, X+2 . . . X+8 are passed through the filters. The signal $f_n$ therefore designates the range of the upper bandwidth limit of the look-ahead interval as being between 8 kilohertz and 9 kilohertz.

It should be noted that the signal $f_n$ is capable of assuming one of 15 values, i.e. the 14 values equal to $f_{c1}$-$f_{c14}$ and a fifteenth value equal to zero which denotes that the highest frequency in the look-ahead interval is less than 1 kilohertz.

Once the block 60 has determined the range of the highest frequency component of the analog signal in the look-ahead interval, a block 62 stores a digital representation of the lowest of 15 sampling rates which exceeds at least twice the upper limit of the range of the highest frequency component in bit positions 15-12 of the allocated 16 bit word in the output memory 24. These sampling rates are predetermined in accordance with the following equation:

$$f_s = 2.5 \times f_{BW}$$

where $f_s$ is the sampling rate and $f_{BW}$ equals one of $f_0$-$f_{14}$ as determined by the following:

$f_{BW}=f_0$ if $f_n<f_0$
$f_{BW}=f_1$ if $f_0 \leq f_n<f_1$
$f_{BW}=f_2$ if $f_1 \leq f_n<f_2$
$f_{BW}=f_3$ if $f_2 \leq f_n<f_3$
$f_{BW}=f_4$ if $f_3 \leq f_n<f_4$
$f_{BW}=f_5$ if $f_4 \leq f_n<f_5$
$f_{BW}=f_6$ if $f_5 \leq f_n<f_6$
$f_{BW}=f_7$ if $f_6 \leq f_n<f_7$
$f_{BW}=f_8$ if $f_7 \leq f_n<f_8$
$f_{BW}=f_9$ if $f_8 \leq f_n<f_9$
$f_{BW}=f_{10}$ if $f_9 \leq f_n<f_{10}$
$f_{BW}=f_{11}$ if $f_{10} \leq f_n<f_{11}$
$f_{BW}=f_{12}$ if $f_{11} \leq f_n<f_{12}$
$f_{BW}=f_{13}$ if $f_{12} \leq f_n<f_{13}$
$f_{BW}=f_{14}$ if $f_{13} \leq f_n$ In the preferred embodiment, the following values are used for $f_0$ through $f_{14}$.

| | |
|---|---|
| $f_0$ = 1 kilohertz | $f_8$ = 10 kilohertz |
| $f_1$ = 2 kilohertz | $f_9$ = 11.5 kilohertz |
| $f_2$ = 3 kilohertz | $f_{10}$ = 13 kilohertz |
| $f_3$ = 4 kilohertz | $f_{11}$ = 14.5 kilohertz |
| $f_4$ = 5 kilohertz | $f_{12}$ = 16 kilohertz |
| $f_5$ = 6.6 kilohertz | $f_{13}$ = 18 kilohertz |
| $f_6$ = 8 kilohertz | $f_{14}$ = 20 kilohertz |
| $f_7$ = 9 kilohertz | |

In the example noted above where the signal $f_n$ equals 8 kilohertz, the value $f_{BW}=9$ kilohertz and hence the sampling frequency $f_s=2.5\times(9$ kilohertz$)=22.5$ kilohertz.

Once the block 62 determines and encodes the sampling rate, control passes to a block 64 which determines the initial value of the corresponding analog signal at the beginning of the first output sample interval at time $t_0$ and develops a 12 bit representation of this value which is stored in bit positions 11-0 of the allocated 16 bit word $W_{OUT1}$ in the output memory 24. In the example illustrated in FIG. 3A, the beginning of this output sample interval to be represented by the word $W_{OUT1}$ in the output memory is coincident with the value of the analog signal represented by the 16 bit input data word $W_1$. Therefore, in this case the block 64 need only convert the 16 bit representation into a 12 bit representation which is concatenated with the four-bit representation of the sampling rate to form the word $W_{OUT1}$ which is stored in the memory 24. However, it may occur that the beginning of the output sample interval represented by the word to be stored in the output memory 24 does not conveniently lie at a point defined by one of the words $W_i$ in the input memory 14. In this case, it is necessary to determine the voltage level of the corresponding analog signal 42 at the beginning of this output sample interval by convolution, as noted more specifically below.

Following the block 64, a block 66 calculates the length of the output sample interval represented by the word $W_{OUT1}$ stored in the output memory 24. This interval in turn determines the beginning of the next output sample interval and is calculated using the encoded sampling rate in the output word $W_{OUT1}$ as follows:

$$I_D = 1/f_s \text{ where } D = 1, 2, 3 \ldots$$

For example, as seen in FIG. 3A, the first output sample interval $I_1$ extends from time $t=t_0$ to time $t=t_{1'}$ where $t_{1'}$ falls between times $t_2$ and $t_3$. This length of time is determined by the period of the sampling frequency $f_s$ established by the block 62, FIG. 2A. The word $W_{OUT1}$ therefore represents a first step of the second staircase approximation of the corresponding analog signal 42.

Figure 3B:
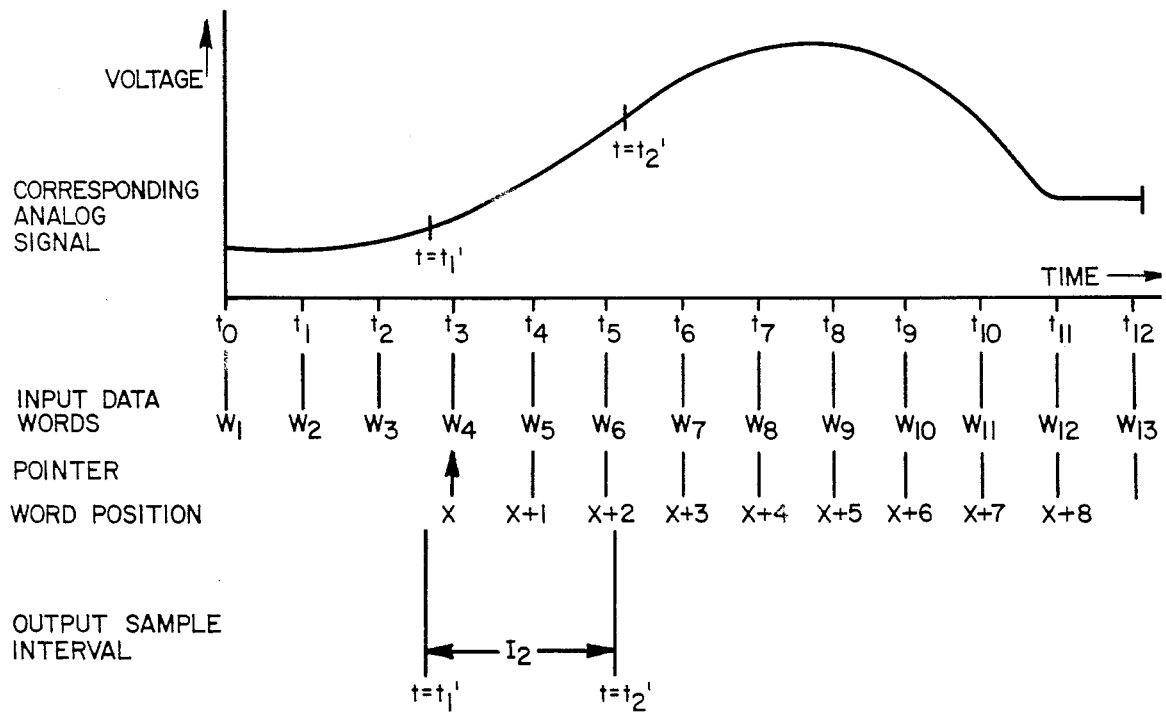

Following the block 66, a block 68 advances the pointer to the next input data word $W_i$ to be processed. The pointer is advanced by a number of input word positions Y, where Y is the number of input word positions in the memory 14 from the word at position X to the input word that defines the first point of the corresponding analog signal at or subsequent to the beginning of the second or next output sample interval. In the example as shown in FIG. 3B, the pointer is moved to the word $W_4$ which is the word defining the level of the input staircase approximation 40 between the times $t_3$ and $t_4$.

Following the block 68, control returns to the block 52 which initiates derivation of a second word $W_{OUT2}$ of the second data format and determination of the beginning of a third output interval beginning at time $t=t_{2'}$ between the times $t=t_5$ and $t=t_6$.

Figure 2B:
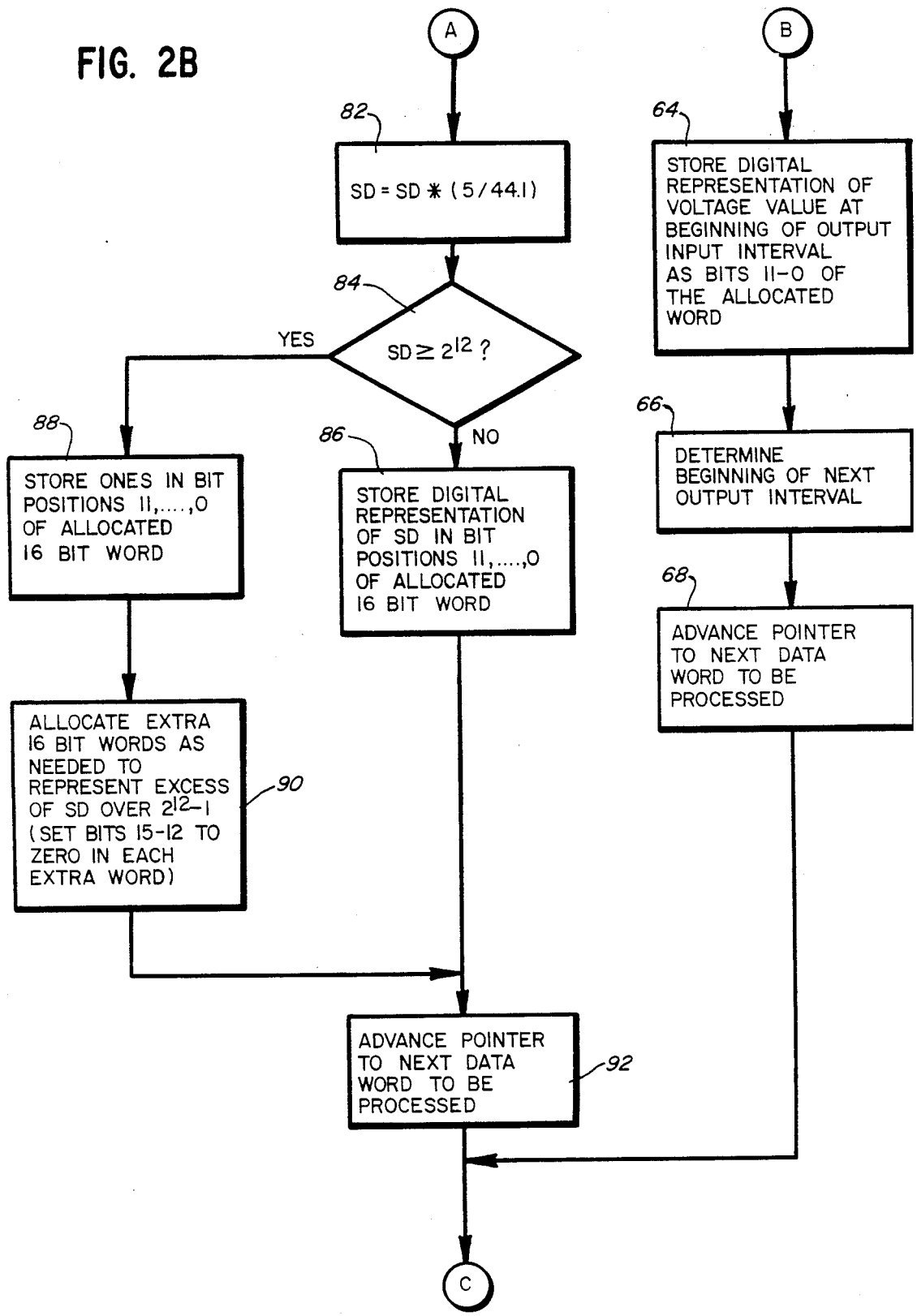

More particularly, during the second pass through the program illustrated in FIGS. 2A and 2B, the words $W_4$-$W_{12}$ are analyzed by the block 56 and are determined not to represent a substantially zero voltage value throughout the time interval $t=t_3$ through $t=t_{11}$. Accordingly, a 16 bit word is allocated in the output memory 24 and the data words $W_4$-$W_{12}$ are passed through the high-pass digital filters to determine the highest frequency component therein. The sampling rate $f_s$ is determined from the highest frequency component by the block 62 and an encoded representation of such sampling rate is stored in bit positions 15-12 of the allocated word $W_{OUT2}$. The block 64 then determines the digital representation of the voltage value at the beginning of the second output sample interval $I_2$. This is accomplished by convolution using the data words $W_4$-$W_6$ between the times $t=t_{1'}$ and $t=t_{2'}$. In practice, this is equivalent to passing the data words through a digital low-pass filter so as to reconstruct a portion of the original analog signal. The digital low-pass filter is implemented using the digital filter data base 20. The cut-off frequency of the low-pass filter is selected to be equal to the value $f_{BW}$ determined by the block 60.

Once the foregoing is accomplished, the block 64 stores a digital representation of the voltage level at the time $t=t_{1'}$ as bits 11-0 of the second output data word $W_{OUT2}$. The second output data word $W_{OUT2}$ therefore represents a second step of the output staircase approximation of the corresponding analog signal.

Figure 3C:
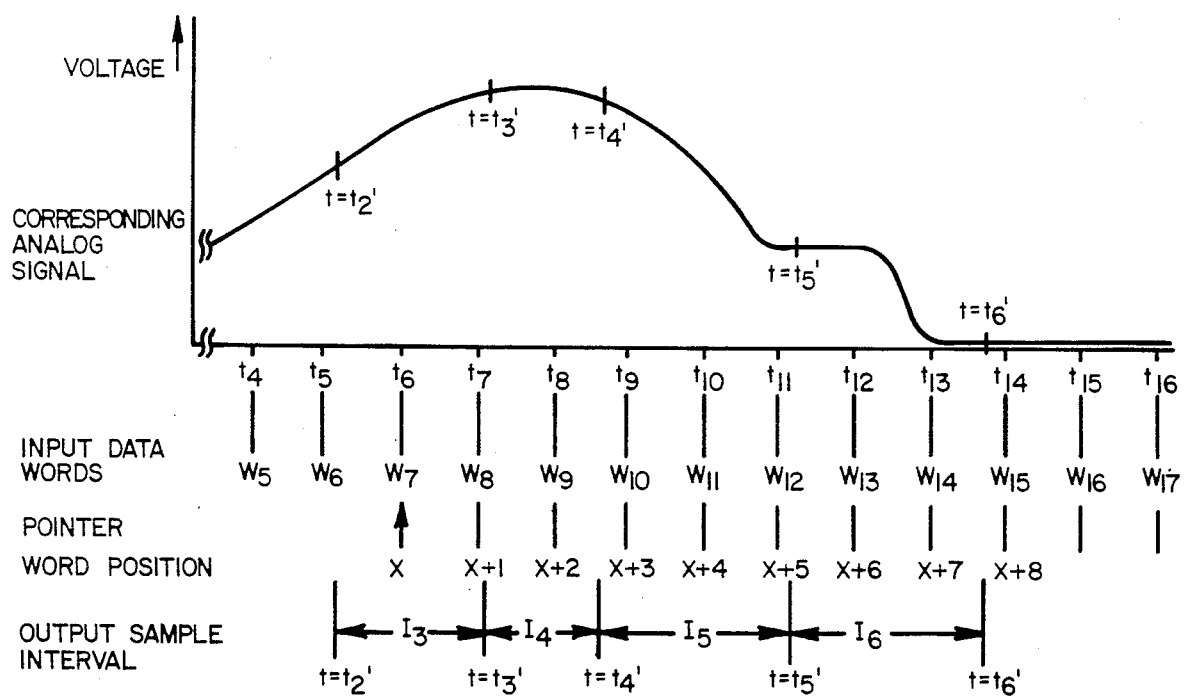

In similar fashion and as seen in FIG. 3C, a third digital word $W_{OUT3}$ of the second format is developed to define the analog signal in an output sample interval $I_3$ between the times $t_{2'}$ and $t_{3'}$. This digital word is developed after moving the pointer to the word $W_7$ which is the first input word defining a point of the corresponding analog signal subsequent to the time $t=t_{2'}$ in the analog signal. The words $W_7$-$W_{15}$ then comprise the look-ahead interval which is used to determine the third output data word defining a third step of the output staircase approximation in the output sample interval $I_3$.

In like fashion, fourth, fifth and sixth digital words $W_{OUT4}$-$W_{OUT6}$ are developed representing the analog signal in output sample intervals $I_4$-$I_6$ beginning with times $t_{3'}$, $t_{4'}$ and $t_{5'}$.

Figure 3D:
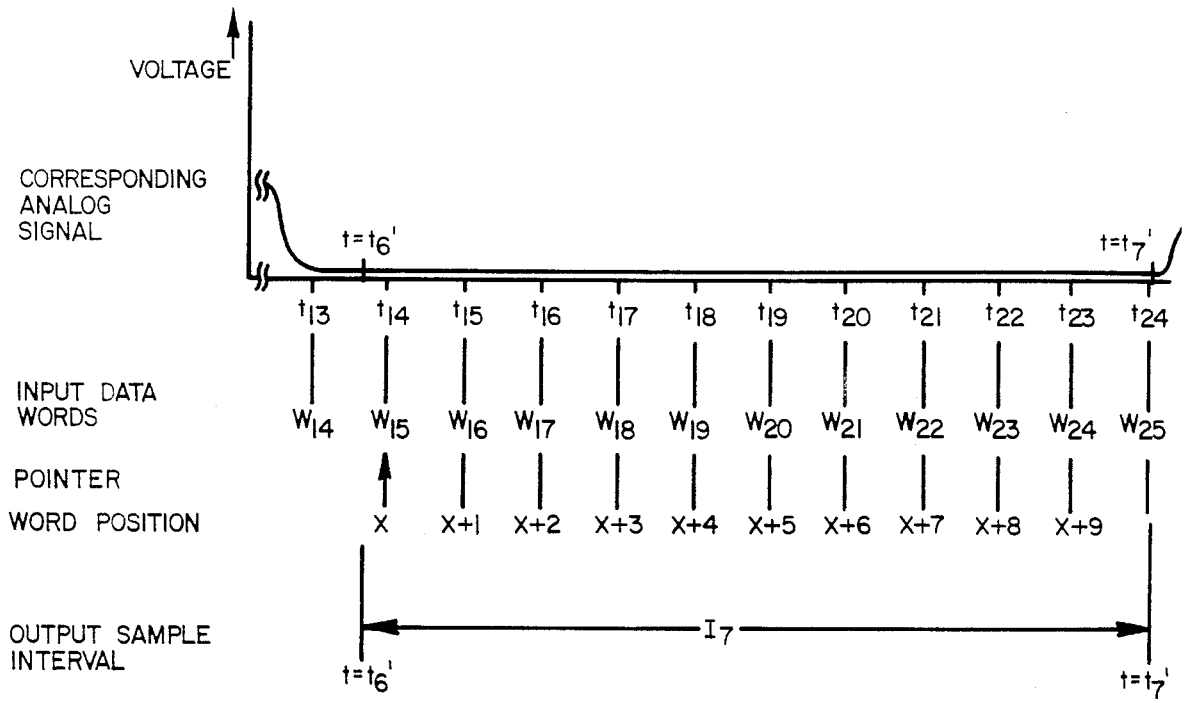

Referring now to FIG. 3D, assume that at time $t_{13}$, the corresponding analog signal drops to substantially zero voltage until time $t_{24}$. The input words $W_{14}$-$W_{24}$ representing the analog signal in this portion are all therefore substantially zero. Once the pointer has been moved to the digital word $W_{15}$, which is the first input word representing the analog signal following the end of the preceding output sample interval $I_6$, the words $W_{15}$-$W_{23}$ are analyzed by the block 56 and control passes therefrom to a block 76 which allocates a 16 bit word in the output memory 24. A block 78 stores zeroes in bit positions 15-12 of the 16 bit word in the memory 24. This coding in these bit positions indicates that silence is to be reproduced in an output sample interval $I_7$.

A block 80 then analyzes the words following the word $W_{23}$ to determine the number of additional consecutive input words which indicate substantially zero value in the corresponding analog signal. In the example illustrated in FIG. 3D, there is one additional word $W_{24}$ which defines an interval of substantially zero level. A value for a variable SD (denoting silence duration) is thereby obtained and is initially defined as the number of consecutive input data words which indicate substantially zero voltage value beginning with the word X.

A block 82 then multiplies the variable SD by a factor of 5/44.1 which represents the ratio of the lowest sampling frequency encoded in the output digital words to the constant sampling frequency used to derive the input words. This converts the variable SD to a value representing the length of time the analog signal is at substantially zero voltage.

A block 84 then checks to determine whether the variable SD is greater than or equal to a value which can be represented by 12 bits in an output word. If this is not the case, a digital representation of the variable SD is stored in bit positions 11-0 of the allocated 16 bit word in the output memory 24. On the other hand, if the variable SD is greater than that which can be represented by 12 bits, a block 88 stores a series of ones in bit positions 11-0 of the allocated 16 bit word and a block 90 allocates extra 16 bit words as needed to represent the excess of SD over the value which can be represented by the 12 bits of the first word. In this case, each of the words which represents the duration of silence includes bit positions 15-12 having zeroes stored therein.

A block 92 then advances the pointer to the next data word to be processed. In the example shown in FIG. 3D, the pointer is moved to the input word following the last word representing a substantially zero level, i.e. the pointer is moved to the word $W_{25}$.

The foregoing conversion process continues until the last data word in the input memory has been processed. It should be noted that there will be a time when less than 9 data words remain in the memory 14 to be processed. In this case, the block 54 retrieves the available remaining data words in the memory 14 and assumes that the number of additional data words required to bring the total up to 9 words contain zeroes in all bit positions.

The foregoing conversion process results in a substantial reduction in the number of digital words required to represent a given portion of an analog signal.

It should be noted that the foregoing conversion process may also be used to compress digital data that does not represent an actual corresponding analog signal. For example, digital words of equal length (i.e. all having the same number of bits) stored in a memory may represent data unrelated to an analog signal. However, if the data is processed using the program illustrated in FIGS. 2A and 2B in a particular sequence, the upper limit of the "bandwidth" of the data can be detected to permit a reduction in the number of digital words to represent the data. In this case, the encoded representation of the "upper bandwidth limit" is concatenated with a digital word having the same number of bits as each of the original input words to form an output word wherein each output word represents the level of a step of an approximation of a corresponding analog signal at the beginning of an output interval and the duration of such step.

Figure 4:
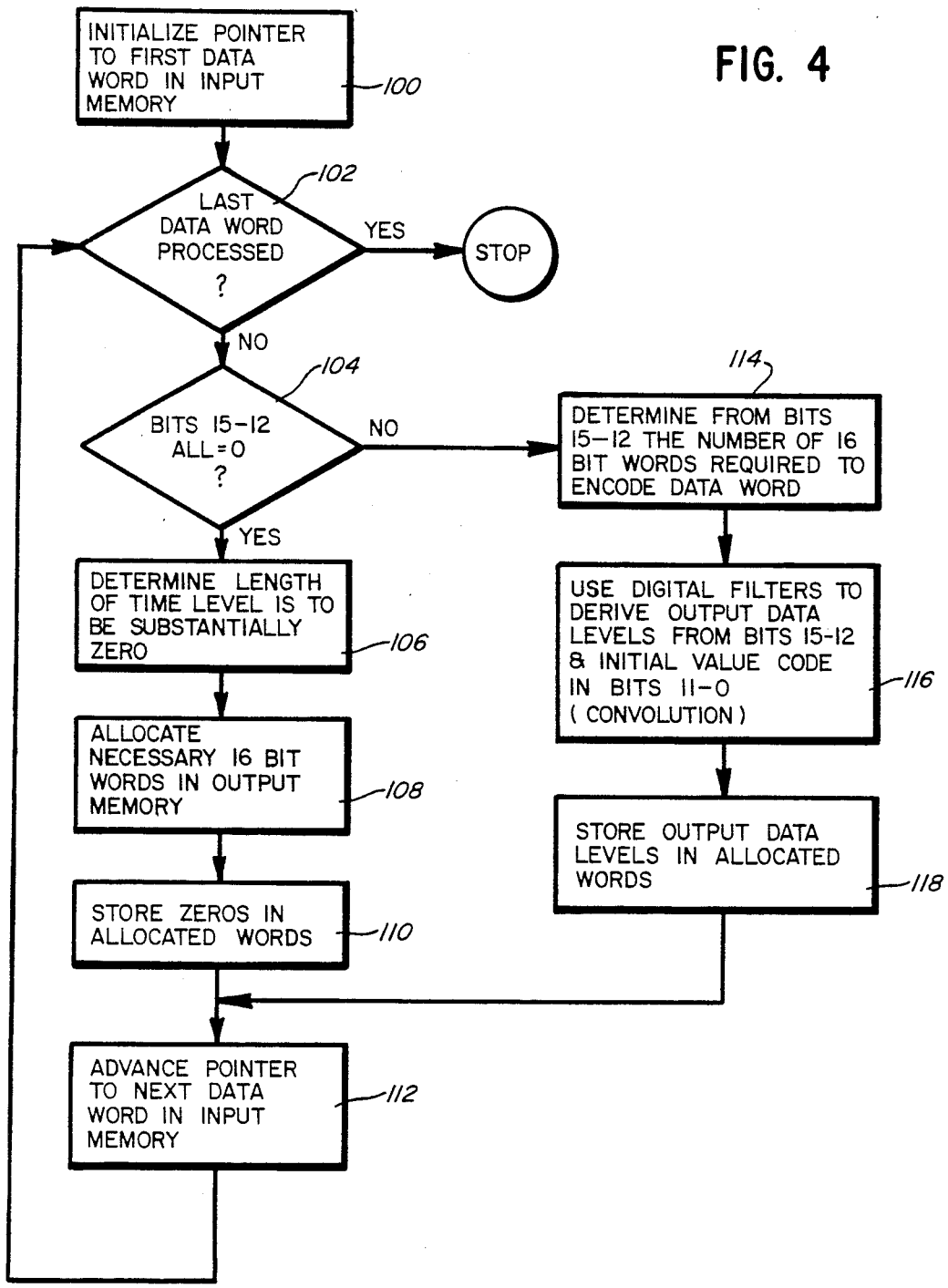

Referring now to FIG. 4, there is illustrated a program which may be stored in the ROM 18 of FIG. 1 to convert the digital words encoded in the second format into data of the first format. In this case, the words of the second format are loaded into the input memory 14 and the words of the first format are derived by the CPU 16 and loaded into the output memory 24.

The process begins at a block 100 which initializes a pointer to the first data word in the input memory. As is evident from the foregoing description, this data word is of the second format wherein a first plurality of bits represent the length of the interval defined by the word and a second plurality of bits represent the level at the beginning of this interval. A block 102 then checks to determine whether the last data word has been processed. If so, the process is terminated. If not, control passes to a block 104 which determines whether the first plurality of bits are all equal to zero. If this is the case, then it has been determined that a substantially zero voltage level must be encoded and a block 106 determines the length of time such level is to be reproduced. This is accomplished by analyzing the number stored in bit positions 11-0 of the data word. If all the bits in bit positions 11-0 are equal to one, successive input data words are checked to determine whether they also represent the duration of a period of substantially zero voltage level. Once the total duration of this period has been determined, the necessary 16 bit words are allocated in the output memory and a block 110 then stores zeroes in the bit positions of the allocated words. A block 112 then advances the pointer to the next data word in the input memory and control returns to the block 102.

If the block 104 determines that the first plurality of bits are not all equal to zero, a block 114 determines from such bits the number of 16 bit word positions required in the output memory to encode the information represented by the input data word. This is determined by multiplying the reciprocal of the sample frequency represented by these bits by 44.1 kilohertz.

A block 116 then reconstructs the corresponding analog signal by convolution of the initial value contained in the input data word with the impulse response of the filter. As a practical matter, this is accomplished utilizing the digital filters afforded by the digital filter data base 20 to derive output data levels from the first and second bits which together form the input word.

A block 118 then stores the derived output data levels in the allocated word positions in the output memory 24. Control then passes to the block 112 which advances the pointer to the next data word in the input memory.

The words of the first format stored in the output memory may thereafter be transferred to other storage media or may be sent over a communication media, as desired.

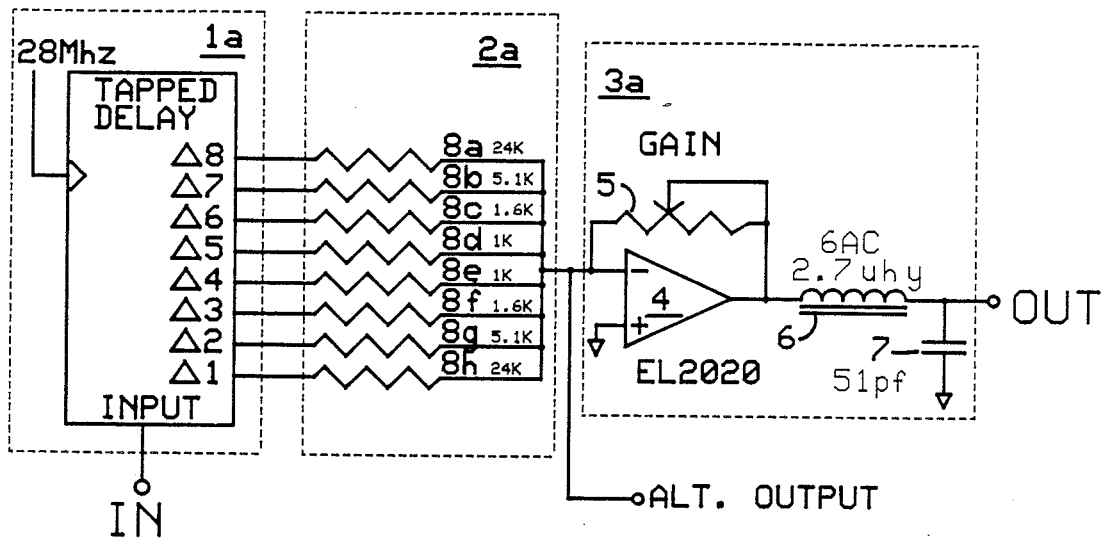

We claim:

1. A method of converting digital data encoded in a first format into digital data encoded in a second format wherein the data of the first format comprises a series of words representing a first staircase approximation of an analog signal having a sequence of levels of equal duration and the data of the second format represents a second staircase approximation of the analog signal having levels of unequal duration, the method comprising the steps of:

(a) analyzing a number of words of the first format to detect the upper bandwidth limit of the analog signal in a portion thereof represented by such words;

(b) determining the amplitude of the analog signal at the beginning of the portion regardless of whether such amplitude is represented by a word of the first format; and (c) developing a word of the second format having a first plurality of bits encoded with a representation of the amplitude of the analog signal at the beginning of the portion and a second plurality of bits encoded with a representation of the upper bandwidth limit.

2. The method of claim 1, wherein the step of analyzing includes the step of passing the number of words through a series of digital filters.

3. The method of claim 1, including the further steps of (d) analyzing further numbers of words of the first format to detect the upper bandwidth limit of the analog signal in subsequent portions thereof represented by such numbers of words; and (e) repeating steps (b) and (c) for each further number of words of the first format to develop additional words of the second format.

4. The method of claim 1, wherein the step (b) includes the step of performing convolution on some of the number of words to reconstruct a segment of the analog signal if the amplitude of the analog signal at the beginning of the portion is not represented by a word of the first format.

5. The method of claim 4, wherein the step of performing convolution includes the step of passing some of the number of words through a digital low-pass filter.

6. The method of claim 1, wherein the levels of the second staircase approximation each have a duration equal to one of a set of durational values and wherein the step of analyzing includes the step of selecting at least a minimum number of words for analysis, such minimum number defining an interval of the analog signal having a duration determined in accordance with the largest of the set of durational values.

7. The method of claim 1, including the further steps of detecting whether the analog signal is at a substantially zero level throughout the portion and developing a word of the second format whereby the second plurality of bits are encoded with a representation of whether the analog signal is at the substantially zero level throughout the portion and the first plurality of bits represent the length of time the analog signal is at the substantially zero level.

8. A method of converting a first series of words representing an analog signal into a second series of words also representing the analog signal, each word of the first series defining the level of the analog signal at the beginning of an interval thereof, the intervals being contiguous and of equal duration, each word of the second series having a first plurality of bits defining a voltage level and a second plurality of bits defining the duration of such level wherein the durations of the levels defined by the second series of words are not of equal length, the method comprising the steps of:
  (a) selecting a number of words of the first series representing a predetermined portion of the analog signal;
  (b) analyzing the number of words to determine the upper bandwidth limit of the predetermined portion;
  (c) determining the level of the analog signal at the beginning of the predetermined portion regardless of whether such level is represented by one of the first series of words;
  (d) developing a word of the second series wherein the first plurality of bits represent the determined level of the analog signal at the beginning of the predetermined portion and wherein the second plurality of bits are encoded in accordance with the detected upper bandwidth limit;
  (e) selecting a further number of words of the first series representing a further predetermined portion of the analog signal; and
  (f) repeating steps (b)–(e) for each further predetermined portion to derive the second series of words.

9. The method of claim 8, wherein the step of analyzing includes the step of passing the number of words through a series of digital filters.

10. The method of claim 8, wherein the step (c) includes the step of performing convolution on some of the number of words to reconstruct a segment of the analog signal.

11. The method of claim 10, wherein the step of performing convolution includes the step of passing some of the number of words through a digital low-pass filter.

12. The method of claim 8, wherein the levels defined by the second series of words each have a duration equal to one of a set of durational values and wherein the predetermined portion is at least as long as a look-ahead interval and further including the step of establishing the duration of the look-ahead interval in accordance with the longest of the set of durational values.

13. The method of claim 8, wherein the step (e) includes the step of determining from the determined upper bandwidth limit the length of a first segment of the analog signal defined by a word of the second series and choosing additional words of the first series representing a second segment of the analog signal subsequent to the first segment to obtain the further number of words.

14. The method of claim 8, wherein the step (b) includes the step of detecting whether the analog signal is at a substantially zero level throughout the predetermined portion and wherein the step (d) includes the step of developing a word of the second series whereby the second plurality of bits are encoded with a representation of whether the analog signal is at the substantially zero level throughout the predetermined portion and the first plurality of bits represent the length of time the analog signal is at the substantially zero level.

* * * * *

United States Patent [19]

Cooper

[11] Patent Number: 4,816,830
[45] Date of Patent: Mar. 28, 1989

[54] WAVEFORM SHAPING APPARATUS AND METHOD

[76] Inventor: James C. Cooper, 1373 Sydney Dr., Sunnyvale, Calif. 94087

[21] Appl. No.: 95,683

[22] Filed: Sep. 14, 1987

[51] Int. Cl.$^4$ ............................................... H03M 1/76
[52] U.S. Cl. ..................................... 341/153; 341/144; 341/154; 341/148
[58] Field of Search .... 340/347 DA, 347 M, 347 SH; 328/14; 364/851, 178, 179; 377/54; 341/144, 148, 153, 154

[56] References Cited

U.S. PATENT DOCUMENTS

| | | | |
|---|---|---|---|
| 3,648,102 | 3/1972 | Bettin | 377/54 X |
| 3,838,414 | 9/1974 | Wiles | 340/347 DA |
| 4,061,909 | 12/1977 | Bryant | 340/347 DA X |
| 4,443,766 | 4/1984 | Belton, Jr. | 328/151 |
| 4,524,423 | 6/1985 | Acampora | 364/724 |
| 4,607,241 | 8/1986 | Horowitz et al. | 333/166 |

*Primary Examiner*—Vit W. Miska
*Assistant Examiner*—Brian K. Young

[57] ABSTRACT

An apparatus and method for generating or shaping the waveform of electronic signals thereby controlling the high frequency energy content of transitions thereof and in particular for imparting a sine squared shape to synchronizing pulses utilized in television systems is shown.

19 Claims, 2 Drawing Sheets